No. 729,893. PATENTED JUNE 2, 1903.
E. K. REA.
SEEDING ATTACHMENT.
APPLICATION FILED JAN. 10, 1903.
NO MODEL. 3 SHEETS—SHEET 1.

Witnesses
Inventor
Edmund K. Rea
by Louis K. Gilson
Attorney

THE NORRIS PETERS CO., PHOTO-LITHO., WASHINGTON, D. C.

No. 729,893. PATENTED JUNE 2, 1903.
E. K. REA.
SEEDING ATTACHMENT.
APPLICATION FILED JAN. 10, 1903.
NO MODEL. 3 SHEETS—SHEET 2.

Witnesses
Inventor
Edmund K. Rea
by Louis K. Gibson.
Attorney

No. 729,893. PATENTED JUNE 2, 1903.
E. K. REA.
SEEDING ATTACHMENT.
APPLICATION FILED JAN. 10, 1903.
NO MODEL. 3 SHEETS—SHEET 3.
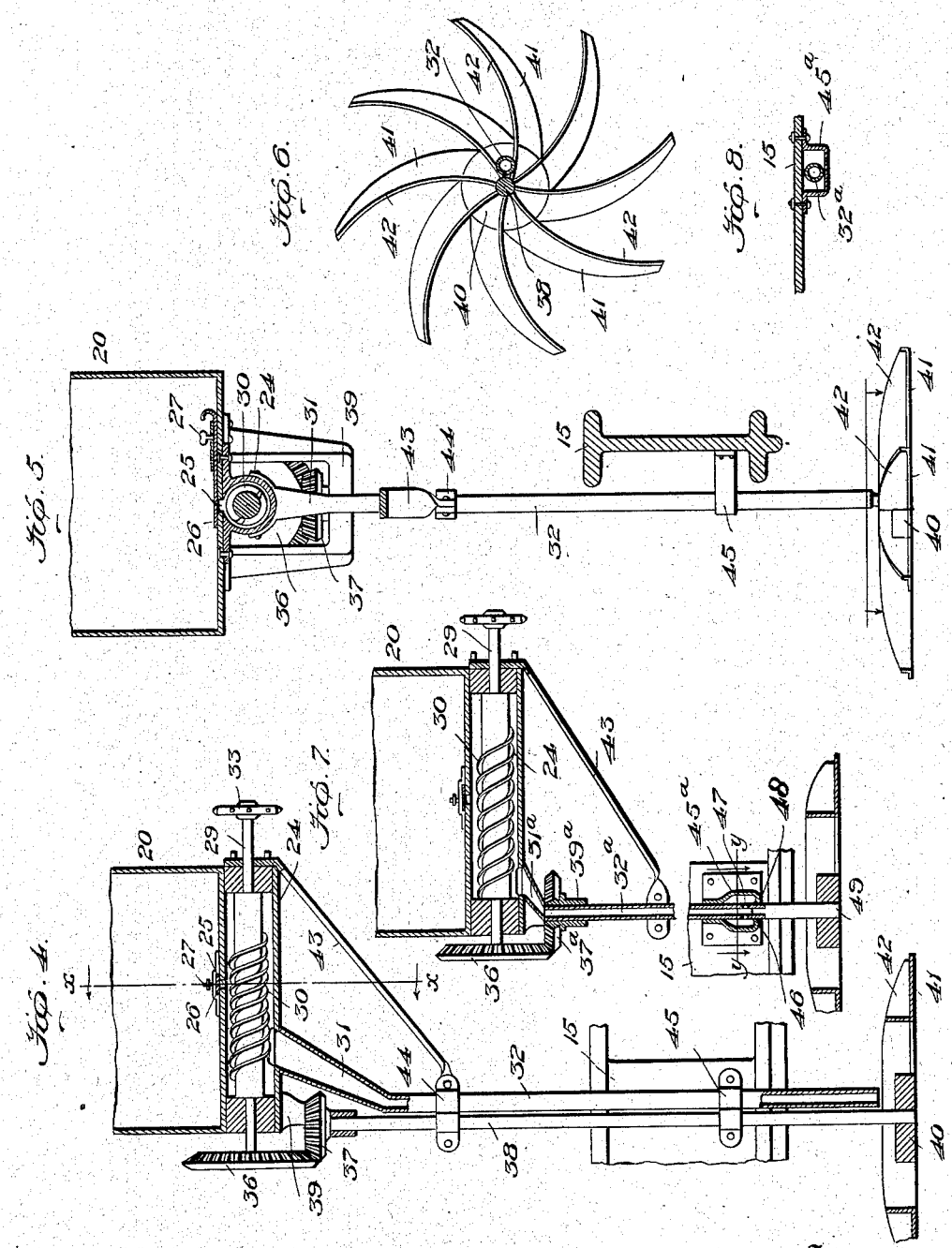
Witnesses
Inventor
Edmund K. Rea
by _____ Attorney.

No. 729,893. Patented June 2, 1903.

UNITED STATES PATENT OFFICE.

EDMUND K. REA, OF OVID, MISSOURI.

SEEDING ATTACHMENT.

SPECIFICATION forming part of Letters Patent No. 729,893, dated June 2, 1903.

Application filed January 10, 1903. Serial No. 138,538. (No model.)

*To all whom it may concern:*

Be it known that I, EDMUND K. REA, a citizen of the United States, and a resident of Ovid, county of Ray, and State of Missouri, have invented certain new and useful Improvements in Seeding Attachments, of which the following is a specification, and which are illustrated in the accompanying drawings, forming a part thereof.

This invention relates to a machine or an attachment for cultivators or other agricultural machines for sowing or distributing broadcast grass and other seeds.

The invention has for its object to provide a machine of this class which shall be particularly, though not necessarily, adapted to the seeding of land already covered with a crop of growing corn or the like; and it consists generally of an arch-frame cultivator having a seed-hopper, a distributing-wheel, and a conduit leading from the hopper to the wheel, whereby as the machine is drawn over the field straddling a row of corn the seed will be scattered over the surrounding land.

The invention also has reference to an improved form of distributing-wheel and to the mechanism for delivering the seed to such wheel or other device for distributing or scattering the same broadcast and to the location and arrangement of said wheel in order that the best results may be secured.

The invention consists of the arrangement and combination of parts hereinafter particularly described, specifically designated in the claims, and illustrated in the accompanying drawings, in which—

Figure 1:
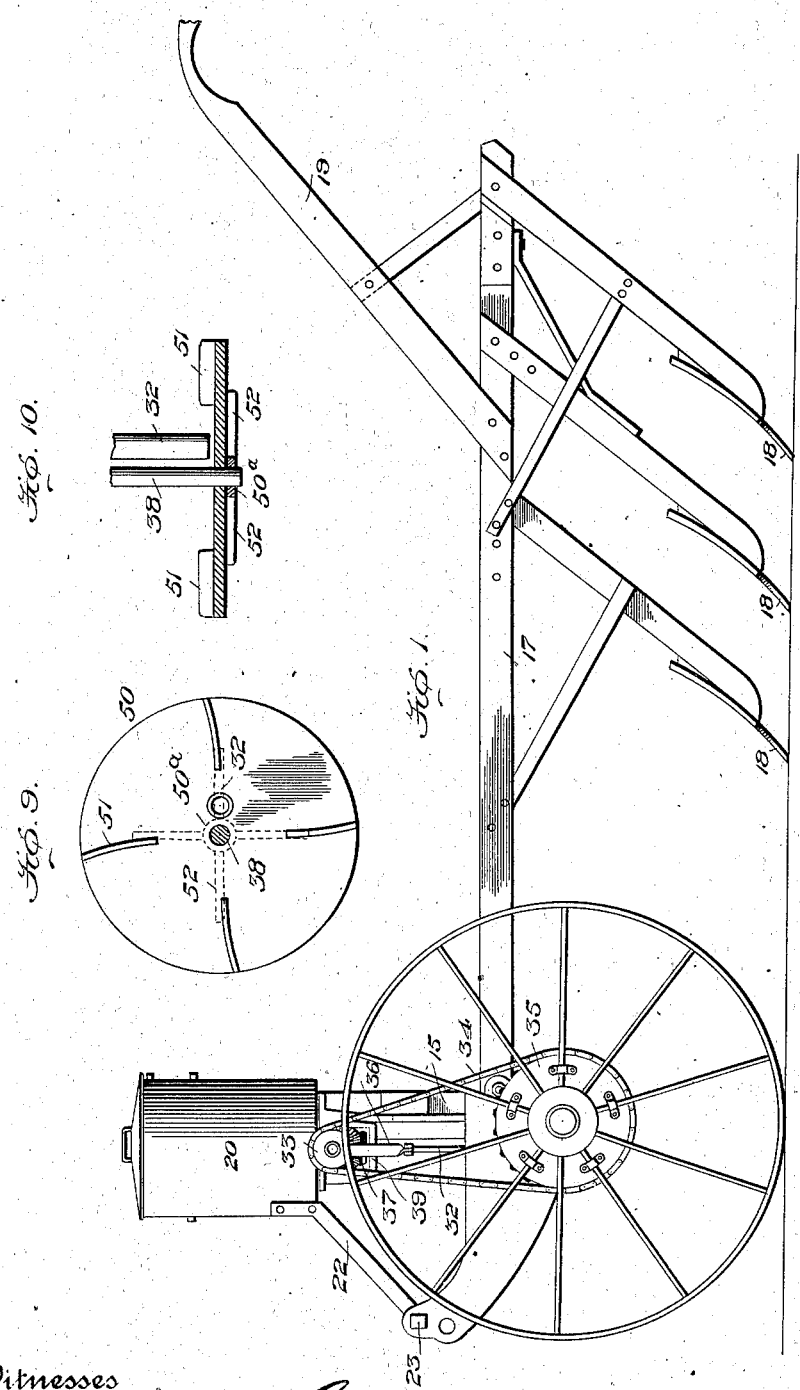
Figure 2:
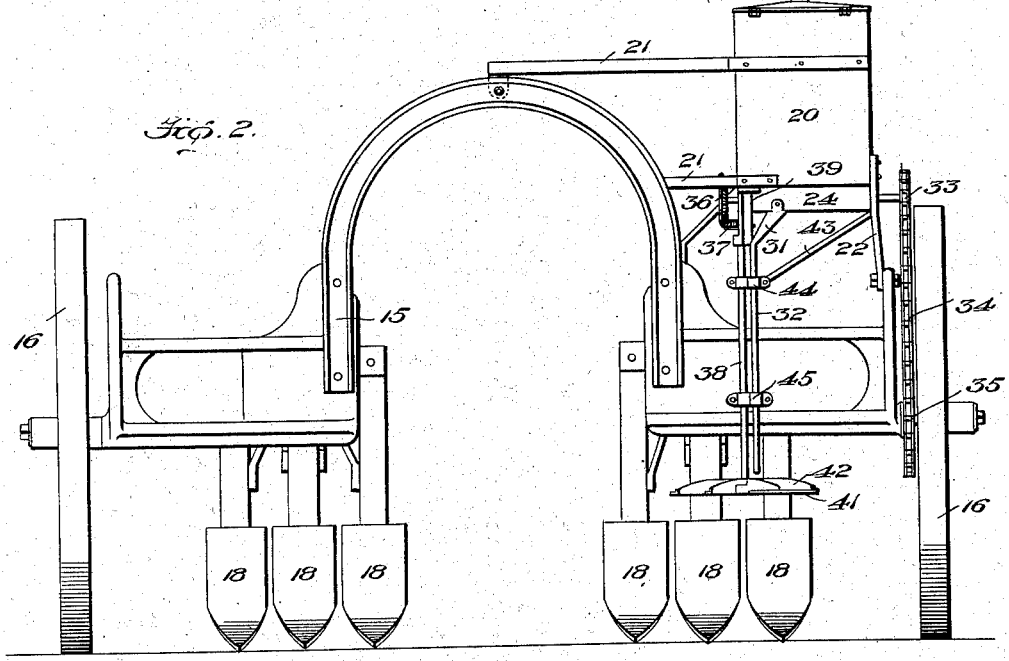
Figure 3:
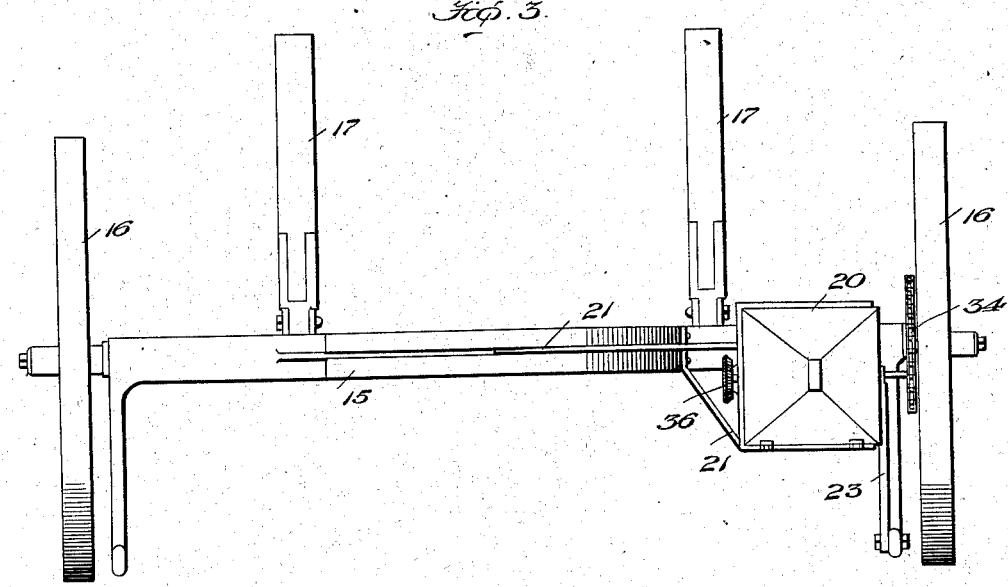

Figure 1 is a side elevation of an ordinary cultivator, showing applied thereto a seed-sowing attachment constructed in accordance with my invention. Fig. 2 is a front elevation of the same with only one of the seeding attachments in place. Fig. 3 is a plan view. Fig. 4 is a view, partially in section, of the seeding attachment proper. Fig. 5 is a section on the line $x\,x$ of Fig. 4. Fig. 6 relates to a detail of the rotating scattering or distributing wheel. Fig. 7 illustrates a modification of the invention. Fig. 8 is a section on the line $y\,y$ of Fig. 7. Fig. 9 is a plan of a modification of the distributing-wheel, and Fig. 10 is a diametrical section of the distributing-wheel seen in Fig. 9.

I have illustrated the invention as an attachment to an ordinary wheeled cultivator, although it is to be understood that it is applicable to an agricultural machine of any other character.

The machine shown consists of the arch frame 15, mounted upon wheels 16 and having connected thereto any preferred cultivating device or devices, as the beams 17, carrying cultivating-shovels 18 and provided with handles 19. Located on the frame 15 and attached thereto by suitable brace-rods is a hopper 20. In order to removably secure the hopper to the frame of the cultivator, brace rods or bars 21, fixed to the hopper-body 20 and bolted to the arch of the frame, may be employed, and also a rod 2,2 likewise secured to the hopper, and bolted, as at 23, to that portion of the frame to which the draft-apparatus is designed to be attached. Below the hopper 20 and disposed transversely thereof is a tubular casing 24, which may be formed integral therewith or made as an attachment and riveted thereto. The bottom of the hopper is provided with an aperture 25 opening into the casing 24 and adapted to be closed or partially closed by a slide 26 for regulating the feed, a thumb-screw 27, passing through a guide 28 and impinging the slide, being designed to secure the latter in its adjusted position. Journaled in the closed ends of the tubular casing is a shaft 29, which is provided within the casing with a worm or screw 30, intended to feed the seed entering the casing through the aperture 25 to a spout 31, leading from the advance end of the tubular casing and communicating with a downwardly-extending or vertical tube 32, which terminates over and is adapted to deliver the seed to the scattering-wheel hereinafter to be described.

The ends of the shaft 29 extend beyond the casing 24, and fixed to that end adjacent to the carrying-wheel 16 at that side of the cultivator is a sprocket-wheel 33, to which motion is communicated through the medium of a chain 34, driven by a sprocket-wheel 35, fixed to the carrying-wheel 16.

The shaft 29 has secured to its end opposite the sprocket 33 a bevel-gear 36, which transmits motion to a pinion 37, mounted on a vertical shaft 38, the upper end of which is supported by and rotates in a hanger 39, depending from the bottom of the hopper 20, as shown in Figs. 4 and 5. The lower end of the shaft 38 projects below the mouth of the tube 32 and has secured thereto a seed-scattering device, as best seen in Fig. 4. This distributing device is designed to be located in advance of the cultivating shovels or devices 18, so that the seed scattered thereby will be covered by the said shovels, and it may consist of a wheel rotatable in a horizontal plane and comprising a hub 40, in which the end of the shaft 38 is secured, and provided with a plurality of radiating flat blades or fingers 41, preferably curved or arranged spirally, as shown in Fig. 6, and at the back of each, according to the direction of rotation of the wheel, is a vertical flange 42. In order to impart a quick rotary motion to the distributing-wheel, the bevel-gear 36 is made relatively larger than the pinion driven thereby.

A brace-rod 43, attached to a clamp 44, embracing the tube 32 and the shaft 38 and fastened to the hopper, may be provided for staying the said tube and shaft, which may also be secured near their lower end to the frame of the cultivator by a plate 45, as seen in Figs. 4 and 5.

In the operation of the machine the seed falls from the hopper 20 through the aperture 25 into the tubular casing 24 and is forced therefrom into the spout 31 by the worm 30, and passing through the tube 32 drops onto the blades or fingers of the rapidly-rotating distributing-wheel and is finally thrown centrifugally by the flanges 42 broadcast over the land, the curved or spiral arrangement of the blades or fingers 41 facilitating this action.

In the modification illustrated in Figs. 7 and 8 I dispense with the shaft 38 and utilize the tube both as means for rotating the distributing-wheel and for delivering the seed thereto. To this end, the tube designated 32ª is mounted to rotate in a hanger 39ª and provided with a bevel-pinion 37ª, receiving motion from the gear 36 on the worm-shaft.

The seed is conveyed from the tubular casing 24 by a spout 31ª, which discharges the seed into the upper open end of the tube 32ª. The lower end of this tube passes through and turns in a casing 45ª, which is bolted to the frame of the cultivator, the bottom edges of the said casing being curved upwardly and inwardly against the tube in order to provide a trough 46 to receive the seed, and also to prevent the seed from becoming wedged in and ground between the bottom of the casing and the rotating tube 32ª. That portion of the tube within the casing is provided with openings 47, and the seed passing therethrough falls into the trough, which, being inclined toward one side, enables the seed to gravitate toward that side and pass through an opening 48, whence it falls onto the distributing-wheel. The latter in this construction is secured to the tube by a stem 49, which is fastened in the lower end of the tube. The operation is otherwise the same as that heretofore explained.

In lieu of the distributing-wheel just described I may employ the modified form illustrated in Figs. 9 and 10. This distributing-wheel consists of a disk 50, fixed to the lower end of the shaft 38, and has on its upper face a plurality of radial blades or ribs 51, slightly curved in the same direction as the blades or fingers of the construction seen in Fig. 6. In order to strengthen the disk 50, it has secured to its under face a hub 50ª, in which the end of the shaft 38 is fixed, and which is provided with radiating fingers 52, one of which is in line or substantially in line with each of the ribs 51, which are shown as terminating short of the center of the disk.

The seed-sowing attachment hereinbefore described is simple in construction and very efficient in operation, and by means of the same the sowing of clover and other seeds and the last cultivating of a planted crop of corn and the covering of the seed may be accomplished in a single operation, thereby avoiding the necessity of going over the ground separately with a seeder and a cultivator.

An important feature of the invention resides in the location of the distributing-wheel near the ground and in preferably disposing the wheel so as to rotate in a horizontal plane. By this arrangement the seed will not be affected by the wind and will be delivered in such manner as not to fall onto the blades of the corn-plants already growing.

The seed is discharged upon the advancing side of the distributing-wheel, and hence thrown forwardly, so as to be covered by the action of the cultivator-shovels. The arrangement of brace-rods as shown is not essential, as the seeder may be attached to any suitable vehicle and the brace or attaching rods will of course be varied to conform to the frame of the machine.

I claim as my invention—

1. In combination with a cultivator, a hopper, a horizontally-rotatable distributing-wheel located in advance of the cultivator-shovels, and means for delivering seed from the hopper to and only upon the advancing side of the distributing-wheel.

2. In combination with a cultivator, a horizontally-rotatable distributing-wheel located in advance of the cultivator-shovels, a hopper, a vertical shaft to which the distributing-wheel is secured, and a conduit leading from the hopper for delivering seed to and only upon the advancing side of the distributing-wheel.

3. In combination with an arch-frame wheeled implement having a central unobstructed space under the arch, a seed-hopper, an actuated seed-distributing device located at the side of such unobstructed space, and a conduit leading from the hopper to the distributing device.

4. In combination with an arch-frame cultivator having an unobstructed archway, a hopper mounted on the frame, a rotatable distributing-wheel located in advance of the cultivator-shovels and below the hopper and together with the cultivator-shovels at the side of the arch, and a conduit for delivering seed from the hopper onto the distributing-wheel.

5. In combination with an arch-frame corn-cultivator having cultivating devices at the sides of the arch, a hopper carried by the frame, a seed-distributer located in advance of the cultivating devices and at the side of the arch, and a conduit leading from the hopper to the distributer.

6. In a seeder, in combination, a hopper, a rotatable distributing-wheel comprising a disk having a plurality of curved radial ribs on its upper face, a shaft extending through the disk, a hub fixed to the lower face of the disk and in which the end of the shaft is fixed and which is provided with a plurality of fingers one of which is substantially in line with each of the ribs, and a conduit for delivering seed from the hopper to the upper face of the wheel.

7. In combination with an arch-frame cultivator, a hopper, a rotatable distributing-wheel comprising a disk having a plurality of curved radial ribs on its upper face, terminating short of the center thereof, a shaft to which the wheel is secured, a plurality of fingers fixed to the under face of the disk and substantially in line with the ribs, and a conduit leading from the hopper and discharging upon the distributing-wheel.

EDMUND K. REA.

Witnesses:
 ARTHUR B. SEIBOLD,
 E. M. KLATCHER.